United States Patent
Luppi et al.

(10) Patent No.: US 8,893,802 B2
(45) Date of Patent: Nov. 25, 2014

(54) ASSEMBLY FOR SUPPORTING AT LEAST ONE FLUID TRANSPORT PIPE THROUGH AN EXPANSE OF WATER, AND ASSOCIATED FACILITY AND METHOD

(75) Inventors: Ange Luppi, Nimes (FR); Philippe Espinasse, Bihorel (FR)

(73) Assignee: Technip France (FR)

( * ) Notice: Subject to any disclaimer, the term of this patent is extended or adjusted under 35 U.S.C. 154(b) by 126 days.

(21) Appl. No.: 13/520,434

(22) PCT Filed: Jan. 4, 2011

(86) PCT No.: PCT/FR2011/050004
§ 371 (c)(1),
(2), (4) Date: Aug. 3, 2012

(87) PCT Pub. No.: WO2011/083268
PCT Pub. Date: Jul. 14, 2011

(65) Prior Publication Data
US 2012/0298373 A1    Nov. 29, 2012

(30) Foreign Application Priority Data

Jan. 5, 2010  (FR) .................................... 10 50028

(51) Int. Cl.
| E21B 17/01 | (2006.01) |
| F16L 1/20 | (2006.01) |
| B63B 22/02 | (2006.01) |
| F16L 1/24 | (2006.01) |
| B63B 22/04 | (2006.01) |
| B63B 21/50 | (2006.01) |

(52) U.S. Cl.
CPC ... *F16L 1/24* (2013.01); *F16L 1/20* (2013.01); *B63B 22/021* (2013.01); *B63B 22/04* (2013.01); *B63B 21/507* (2013.01); *E21B 17/012* (2013.01)

USPC .................. 166/350; 166/345; 405/224.3

(58) Field of Classification Search
CPC ... E21B 17/012; E21B 17/015; B63B 22/021; B63B 22/04; B63B 22/18; F16L 1/24
USPC .................. 166/350, 345, 367; 405/169, 171, 405/224.2, 224.3; 441/1, 23, 133
See application file for complete search history.

(56) References Cited

U.S. PATENT DOCUMENTS 3,818,524 A * 6/1974 Starkey ........................... 441/25
3,906,564 A * 9/1975 Thompson et al. ............. 441/25

(Continued)

FOREIGN PATENT DOCUMENTS

| GB | 2 180 809 | 4/1987 |
| GB | 2 295 408 | 5/1996 |
| WO | WO 2009/156695 A1 | 12/2009 |

OTHER PUBLICATIONS

International Search Report dated Jun. 17, 2011 issued in corresponding international patent application No. PCT/FR2011/050004.

*Primary Examiner* — Matthew Buck
(74) *Attorney, Agent, or Firm* — Ostrolenk Faber LLP

(57) ABSTRACT

The disclosure relates to an assembly including a supporting buoy and an anchoring assembly (28) comprising a base (100) attached to the bed (12) of the expanse of water. The assembly comprises a flexible anchoring line (30) connecting the anchoring assembly (28) to the supporting buoy (26). The anchoring line (30) comprises a lower section (84) made of chain links (92). The anchoring assembly (28) comprises a device (110) for guiding the lower section (84). The lower section (84) is movably mounted in the guide device (110) relative to the base (100), between an extended configuration and a contracted configuration, and a locking member (114) which can be released from the anchor line (30) on the anchoring assembly (28).

19 Claims, 15 Drawing Sheets

(56) References Cited

U.S. PATENT DOCUMENTS

| | | | |
|---|---|---|---|
| 3,965,512 A * | 6/1976 | Bennett et al. | 441/25 |
| 4,303,037 A * | 12/1981 | Helveston et al. | 114/230.23 |
| 4,358,834 A * | 11/1982 | Swenson | 367/4 |
| 4,459,931 A * | 7/1984 | Glidden | 114/230.1 |
| 4,793,737 A * | 12/1988 | Shotbolt | 405/169 |
| 5,505,560 A * | 4/1996 | Brown et al. | 405/195.1 |
| 5,639,187 A * | 6/1997 | Mungall et al. | 405/195.1 |
| 5,957,074 A * | 9/1999 | de Baan et al. | 114/230.12 |
| 6,109,833 A * | 8/2000 | Savy | 405/195.1 |
| 6,206,742 B1 * | 3/2001 | Bull et al. | 441/1 |
| 6,595,725 B1 * | 7/2003 | Shotbolt | 405/224.2 |
| 6,719,497 B1 * | 4/2004 | Pollack et al. | 405/224 |
| 7,025,533 B1 * | 4/2006 | Mungall et al. | 405/158 |
| 7,025,535 B2 * | 4/2006 | Chiesa et al. | 405/169 |
| 7,404,695 B2 * | 7/2008 | Chenin | 405/224.3 |
| 7,591,316 B2 * | 9/2009 | Hatton | 166/355 |
| 2004/0161984 A1 | 8/2004 | Lima de Almeida et al. | |
| 2005/0158126 A1 * | 7/2005 | Luppi | 405/224.2 |
| 2008/0089745 A1 * | 4/2008 | Salome et al. | 405/224.2 |
| 2010/0068955 A1 * | 3/2010 | Wiggin et al. | 441/7 |
| 2011/0146797 A1 * | 6/2011 | Tan et al. | 137/1 |

* cited by examiner

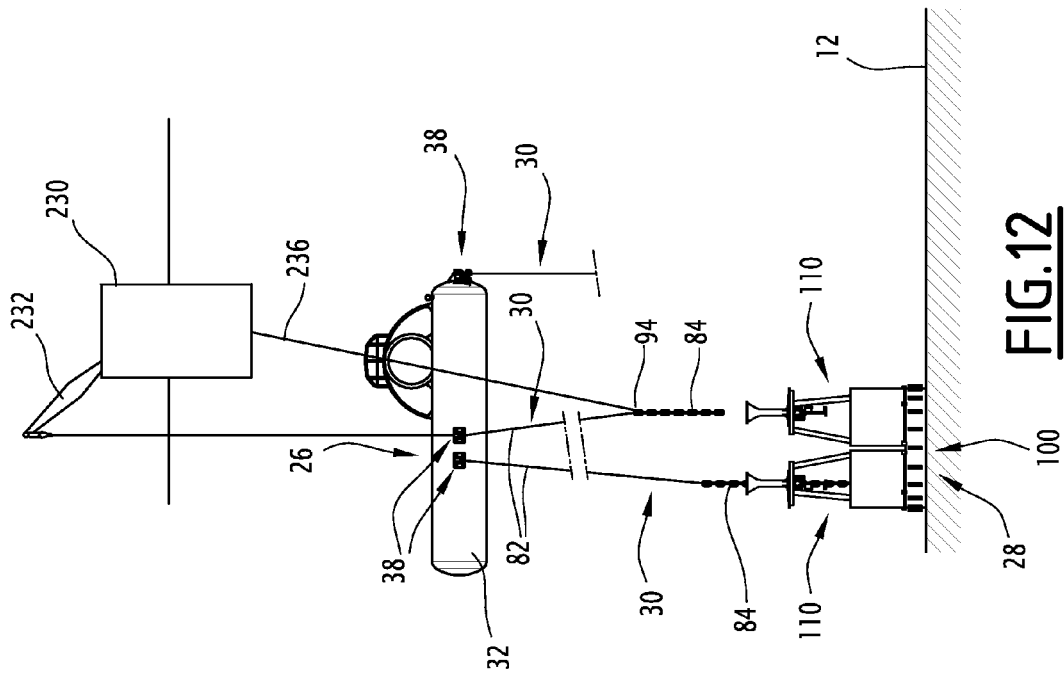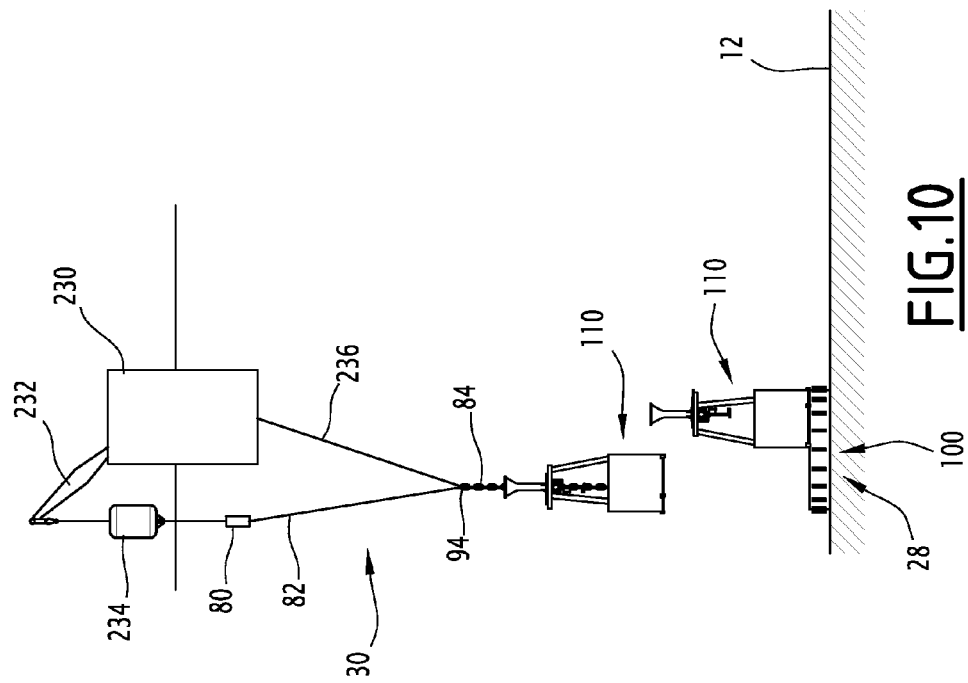

ASSEMBLY FOR SUPPORTING AT LEAST ONE FLUID TRANSPORT PIPE THROUGH AN EXPANSE OF WATER, AND ASSOCIATED FACILITY AND METHOD

CROSS REFERENCE TO RELATED APPLICATIONS

The present application is a 35 U.S.C. §371 National Phase conversion of PCT/FR2011/050004, filed Jan. 4, 2011, which claims benefit of French Application No. 10 50028, filed Jan. 5, 2010, the disclosures of which are incorporated herein by reference. The PCT International Application was published in the French language.

TECHNICAL FIELD

The present invention relates to a submerged assembly for supporting at least one fluid transport pipe through an expanse of water, of the type including:
- a supporting buoy intended to be completely submerged in the expanse of water, the buoy being kept spaced away from the bed of the expanse of water under the effect of its own buoyancy, the buoy including at least one pipe bearing surface;
- at least one anchoring assembly comprising a base designed to be attached to the bed of the expanse of water;
- at least one flexible anchoring line connecting the anchoring assembly to the supporting buoy;
- the anchoring line comprising at least one lower section.

BACKGROUND OF THE INVENTION

Such a support assembly is intended in particular to support pipes transporting fluids between a production assembly, situated on the bed of an expanse of water, and a surface assembly.

The fluid transported by the transport pipe is in particular a mixture of liquid or gaseous hydrocarbons, which are collected from wells formed in the bed of an expanse of water.

Known for example from GB 2 295 408 is a facility comprising a support assembly of the aforementioned type.

This facility includes a plurality of parallel transport pipes supported by the support assembly. Each pipe has a lower section formed by a semi-rigid riser suspended by a catenary between the bed assembly and the support assembly.

Each pipe also includes a flexible upper section, designated by the term "jumper," which connects the support assembly to the surface assembly.

The upper flexible section is in the shape of a J. It is thus capable of damping the relative movements of the surface assembly due in particular to waves, wind, the swell and/or sea currents.

To ensure proper strength of the lower sections, the support assembly includes a buoy completely submerged under the surface of the expanse of water at a sufficient depth for the horizontal movements of the buoy related to the currents and the surface agitation of the expanse of water to be minimal.

To ensure that the supporting buoy is kept in position, the latter part has sufficient buoyancy to create a force moving the buoy toward the surface.

The buoy is also kept in position using anchoring lines that are kept stressed. The lower end of each anchoring line is fastened in the bed of the expanse of water by means of an anchoring assembly.

Such a submerged support assembly is robustly attached and makes it possible to keep the supporting buoy and the pipes in position in a satisfactory manner relative to the bed of the expanse of water.

It is not, however, fully satisfactory. In fact, to ensure an appropriate configuration of the transport pipes, the support must be kept substantially horizontal in the expanse of water. Furthermore, the tension applied on each anchoring line must be adjusted to balance the position of the supporting buoy and prevent certain anchoring lines from undergoing excessive traction forces.

This is made all the more complex by the fact that the anchoring lines are generally provided in pairs, so as to ensure redundancy in terms of security.

It is therefore extremely difficult to precisely predict the length of each anchoring line and the tension that will be applied on each anchoring line once the buoy is submerged in position and all of the anchoring lines are installed.

SUMMARY OF THE INVENTION

One aim of the invention is therefore to have a support assembly for a plurality of pipes that comprises a completely submerged supporting buoy, attached by anchoring lines on the bed of the expanse of water, the supporting buoy being able to be positioned very precisely and in a very balanced manner in the expanse of water.

To that end, the invention relates to a submerged assembly of the aforementioned type, characterized in that the anchoring assembly comprises:
- a device for guiding the lower section, the lower section being movably mounted in the guide device relative to the base, between an extended configuration, in which the height of the anchoring line protruding above the base is maximal, and a contracted configuration, in which the height of the anchoring line above the base is minimal;
- a releasable locking member of the anchor line on the anchoring assembly.

The submerged assembly according to the invention may include one or more of the following features, considered alone or according to all technically possible combinations:
- the lower section of the anchoring line is made from chain links;
- the anchoring line includes an upper section made from a cable, in particular a braided rope, the length of the lower section advantageously being less than 20% of the length of the upper section;
- the guide device comprises a tubular member for passage of the lower section, the lower section being engaged through a passage formed in the tubular member;
- the tubular member comprises at least one angular indexing member of the lower section relative to a circulation axis of the lower section in the passage, the angular indexing member protruding in the passage;
- the tubular member defines an upper guide surface diverging upward away from the base;
- the guide device comprises a stationary framework, the tubular member being articulated relative to the stationary framework around at least one substantially horizontal axis of rotation;
- the releasable locking member can be jointly rotated with the tubular member relative to the stationary framework;
- the guide device comprises at least one traction mechanism of the lower section capable of moving the lower section toward the contracted configuration thereof;

the releasable locking member is movably mounted relative to the lower section between a position disengaged from the lower section and a position engaged on the lower section;

the guide device comprises at least one guide pulley provided with attachment members of the lower section, the support assembly comprising at least one traction mechanism of the lower section positioned away from the anchoring assembly;

the guide device is removably mounted on the base; and the locking member is supported by the base of the anchoring assembly.

The invention also relates to a facility for exploiting a fluid through an expanse of water, of the type including:

a bed assembly, secured to the bed of the expanse of water;

a surface assembly at least partially extending above the surface of the expanse of water;

a support assembly as defined above;

at least one fluid transport pipe connecting the bed assembly to the surface assembly, at least one section of the transport pipe being positioned bearing on the supporting surface of the buoy.

The invention also relates to a method for placing a facility for exploiting a fluid as described above, characterized in that it comprises the following steps:

completely submerging the supporting buoy of the support assembly;

fastening the or each anchoring line on the anchoring assembly, and on the supporting buoy;

moving the lower section of the anchoring line relative to the anchoring assembly through the guide device, to adjust the height of the anchoring line protruding above the base;

engaging the locking member on the anchoring line to keep the anchoring line in a vertical position relative to the anchoring assembly.

The method according to the invention may include one or more of the following features, considered alone or according to all technically possible combinations:

the fastening step comprises temporarily fastening the lower section on the anchoring assembly and vertically suspending the anchoring line by means of a completely submerged float, then fastening the or each anchoring line on the supporting buoy;

the method comprises a step for placing the transport pipe, the placement step comprising placing a lower section of the transport pipe between the bed assembly and the support assembly, and placing an upper section of the transport pipe between the support assembly and the surface assembly, and connecting the lower section to the upper section; and the placement of the lower section of the transport pipe comprises fastening a flexible link near an upper end of the lower section of the transport type, the flexible link comprising an attachment stop on the supporting buoy;

temporarily fastening the attachment stop on the supporting buoy;

then pulling the flexible link to raise the upper end of the lower section of the transport pipe on the supporting buoy.

The invention also relates to a method for placing a fluid exploitation facility, the facility including:

a support assembly for at least one fluid transport pipe through an expanse of water, the support assembly including:

a supporting buoy intended to be completely submerged in the expanse of water, the buoy being kept spaced away from the bed of the expanse of water under the effect of its own buoyancy, the buoy comprising at least one pipe bearing surface;

at least one anchoring assembly comprising a base intended to be attached to the bed of the expanse of water;

at least one flexible anchoring line connecting the anchoring assembly to the supporting buoy;

the facility comprising:

at least one fluid transport pipe connecting the bed assembly to the surface assembly, at least one section of the transport pipe being positioned bearing on the supporting surface of the buoy;

the method comprising the following steps:

completely submerging the supporting buoy of the support assembly;

fastening the or each anchoring line on the anchoring assembly, and on the supporting buoy;

placing the transport pipe, the placement step comprising placing a lower section of the transport pipe between a bed assembly and the support assembly, and placing an upper section of the transport pipe between the support assembly and a surface assembly, and connecting the lower section to the upper section, the placement of the lower section of the transport pipe comprising:

fastening a flexible link near an upper end of the lower section of the transport pipe, the flexible link comprising an attachment stop on the supporting buoy;

temporarily fastening the attachment stop on the supporting buoy;

then pulling the flexible link to raise the upper end of the lower section of the transport pipe on the supporting buoy.

The method, facility and support assembly may include one or more of the preceding features, considered alone or according to all technically possible combinations.

Furthermore, according to one alternative, the facility comprises a plurality of transport pipes, the placement of each lower section of a transport pipe comprising fastening a flexible link near an upper end of the lower section of the transport pipe, the flexible link comprising an attachment stop on the supporting buoy; temporarily fastening the attachment stop on the supporting buoy; and, once the attachment stops of all of the flexible links are fastened on the buoy, pulling each flexible link to raise the upper end of the lower section of the transport pipe on the supporting buoy.

The support assembly does not necessarily comprise a device for guiding the lower section of the anchoring line, the lower section of the anchoring line being movably mounted in the guide device relative to the base between a deployed configuration, in which the height of the anchoring line protruding above the base is maximal, and a contracted configuration, in which the height of the anchoring line above the base is minimal, or a locking member that can be released in a vertical position from the anchoring line on the anchoring assembly.

The method does not necessarily comprise moving the lower section of the anchoring line relative to the anchoring assembly through the guide device, to adjust the height of the anchoring line protruding above the base, or engaging the locking member on the anchoring line to keep the anchoring line in a vertical position relative to the anchoring assembly.

BRIEF DESCRIPTION OF THE DRAWINGS

The invention will be better understood upon reading the following description, provided solely as an example and done in reference to the appended drawings, in which:

FIGS. 8 to 12 are diagrammatic views similar to FIG. 1 of the successive steps of a method for placing the submerged support assembly according to the invention in the expanse of water;

DESCRIPTION OF PREFERRED EMBODIMENTS

A first fluid exploitation facility 10 according to the invention is shown in FIGS. 1 to 7.

This facility 10 is intended to transport a fluid collected in the bed 12 of an expanse of water 14 toward the surface 16 of the expanse of water. The fluid is advantageously a mixture of liquid and/or gaseous hydrocarbons.

The expanse of water 14 is for example an expanse of saltwater, such as a sea or ocean, or an expanse of freshwater, such as a lake. The depth of the expanse of water 14, examined in light of the facility 10 between the bed 12 and the surface 16, is greater than 800 meters and is in particular comprised between 800 meters and 3,000 meters.

Figure 1:
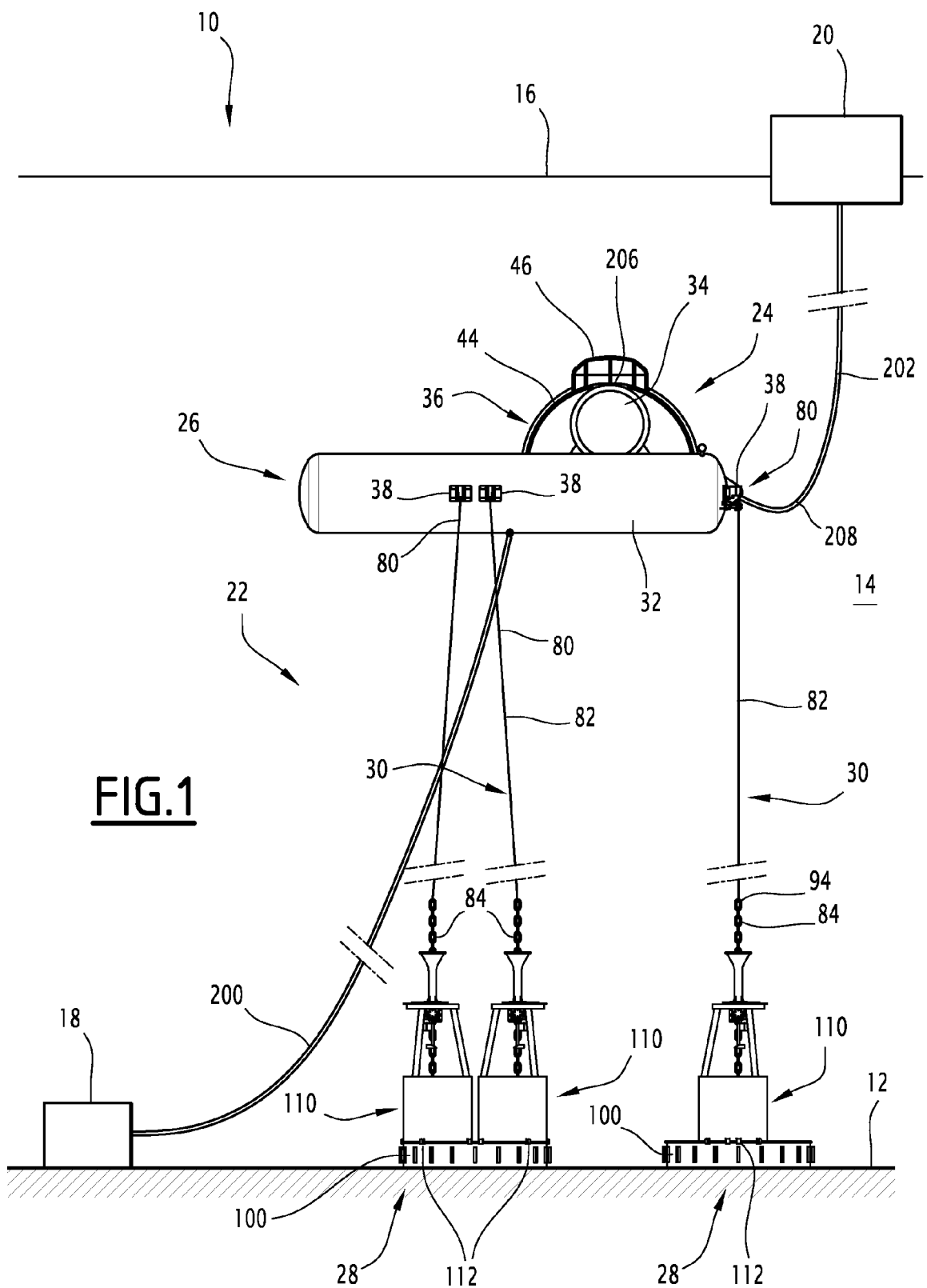
FIG. 1 is a diagrammatic side view of a fluid exploitation facility, including one first submerged support assembly according to the invention.

As illustrated by FIG. 1, the facility 10 comprises a bed assembly 18 intended to collect the fluid extracted from the bed 12 of the expanse of water, a surface assembly 20, at least partially positioned above the surface 16 of the expanse of water 14, and at least one pipe 22 for transporting fluid between the bed assembly 18 and the surface assembly 20.

In the example illustrated in FIGS. 1 to 7, the facility 10 comprises a plurality of pipes 22 arranged in parallel, for example between 2 and 20 transport pipes 22.

The facility 10 also comprises a first submerged assembly 24 supporting the or each pipe 22.

The bed assembly 12 is for example a stationary underwater facility including a wellhead, a manifold, and/or another collector, and delivering a product coming from a fluid deposit situated under the surface of the expanse of water.

The surface assembly 20 is partially submerged in the expanse of water. It for example includes a floating platform or a floating production, storage and offloading unit for a fluid, designated by the acronym "FPSO."

This assembly 20 comprises at least one fluid reservoir and means for offloading the fluid (not shown) coming from the reservoir to transport that fluid toward a facility located on land.

According to the invention, the submerged assembly 24 comprises a submerged buoy 26 for supporting and guiding the pipes 22, a plurality of anchoring assemblies 28 attached to the bed 12 of the expanse of water 14, and a plurality of anchoring lines 30 connecting each anchoring assembly 28 to the buoy 26.

Figure 2:
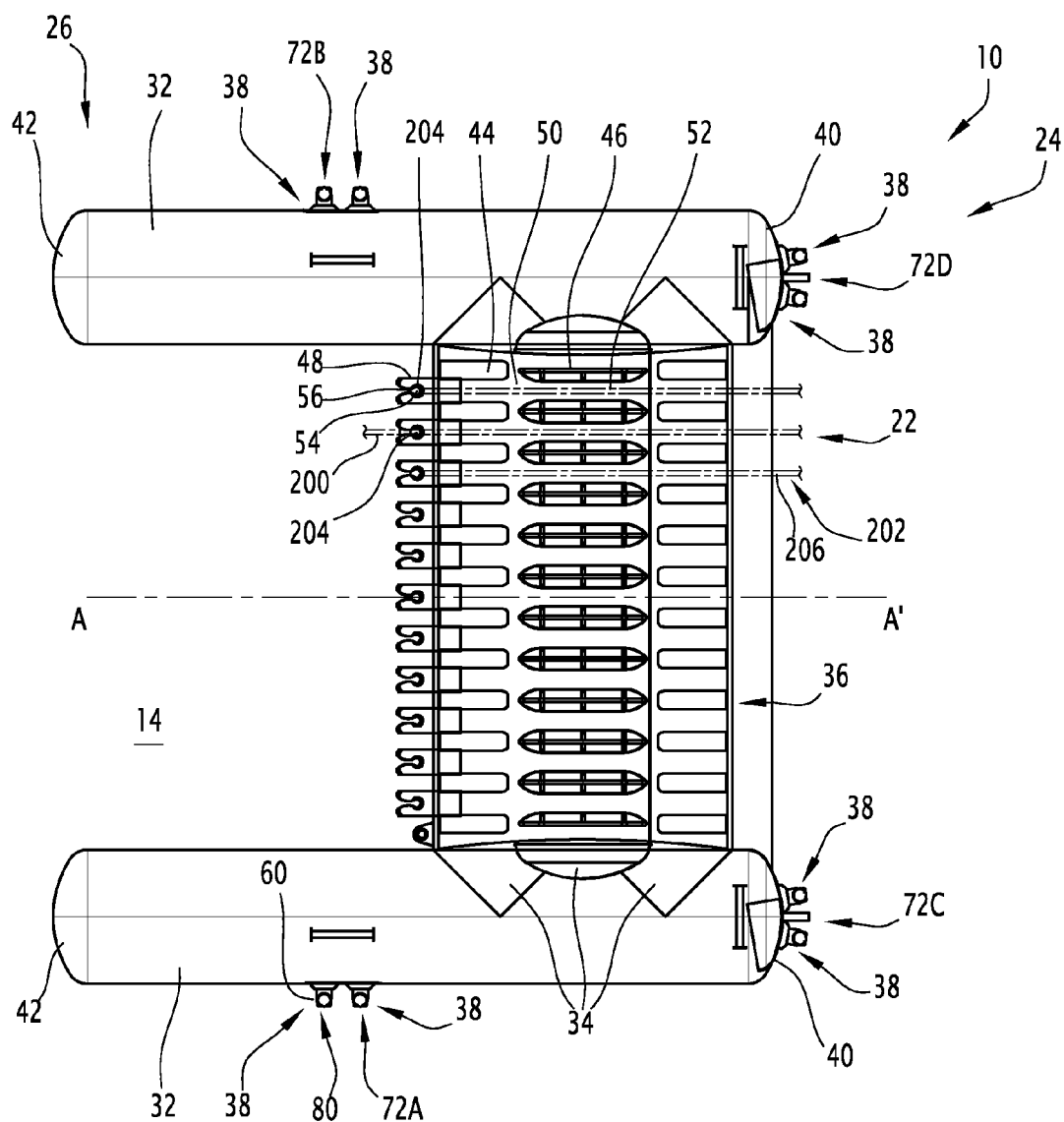
FIG. 2 is a top view of the supporting buoy of the support assembly of FIG. 1.

As illustrated by FIG. 2, the submerged buoy 26 in this example comprises two longitudinal horizontal maintenance boxes 32, at least one transverse box 34 connecting the two longitudinal boxes 32, and an assembly 36 guiding and supporting each pipe 22.

The buoy 26 also comprises assemblies 38 for mooring each anchoring line 30.

As illustrated by FIG. 2, the longitudinal boxes 32 extend parallel to a substantially horizontal central axis A-A'.

In the example illustrated in FIG. 2, the buoy 24 comprises three parallel transverse boxes 34 positioned perpendicular to the axis A-A' near a rear end 40 of each longitudinal box 32.

Projected in a horizontal plane, the submerged buoy 26 is substantially in the shape of an open U between the front ends 42 of the longitudinal boxes 32.

The distance separating the longitudinal boxes 32 from one another is substantially equal to the length of said boxes.

In reference to FIGS. 1 and 2, the guide assembly 36 has, for each pipe 22, a pipe support arch 44, a gutter 46 for guiding the pipe 22, positioned at the apex of the arch 44, and a connecting arm 48 positioned at the foot of the arch 44.

In the example illustrated in FIGS. 1 and 2, the arches 44 are each fastened by their lower ends on the boxes 34. They overlap each box 34 while extending substantially in vertical planes parallel to the axis A-A'.

Each arch 46 defines an upper pipe bearing surface 50 on which at least one section of the pipe 22 rests.

In the example illustrated in FIG. 2, the arches 44 are formed in a single piece and are connected to one another.

In cross-section in a vertical plane, each surface 50 has an upwardly-oriented concave shape.

Each gutter 46 protrudes vertically from the bearing surface 50, at the apex of the arch 44.

Each gutter 46 delimits a longitudinal passage 52 for guiding the pipe 22 emerging longitudinally on either side of the gutter 46. The transverse expanse of the passage 52 is substantially equal to the outer diameter of the pipe 22 resting on the arch 44.

The passages 52 of the different gutters 46 extend parallel to one another to allow a parallel arrangement of the pipes 22 and to eliminate the risk of said pipes 22 becoming tangled with one another.

Each connecting arm 48 protrudes longitudinally from a lower end of each arch 44 situated between the boxes 32. Each arm 48 delimits an inner lumen 54 for passage of the pipe, with a vertical or inclined axis.

The lumen 54 emerges longitudinally forward through a slot 56 for inserting a flexible guiding link, as will be seen below.

Figure 7:
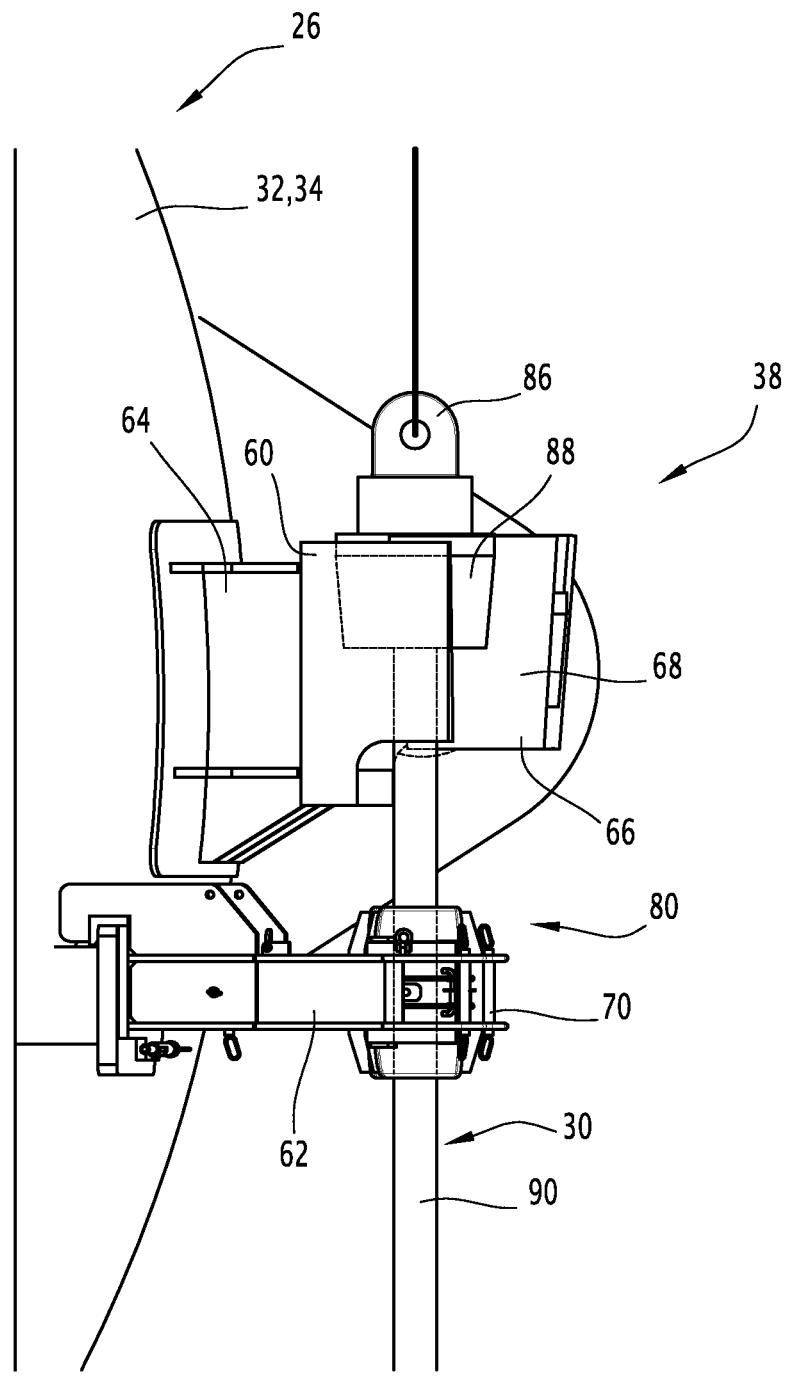
FIG. 7 is a side view of the means for fastening the anchoring line on the supporting buoy.

As illustrated by FIG. 7, each mooring assembly 38 of an anchoring line 30 comprises a receptacle 60 and a gripping arm 62.

The receptacle 60 is fastened on a box 32, 34 of the buoy 26 by a connecting arm 64.

The receptacle 60 has a substantially C-shaped horizontal section. It delimits a tapered inner cavity 66 converging downward and emerging away from the box 32, 34 through a vertical slot 68 for the passage of the mooring.

The gripping arm 62 has a jaw 70 at its free end capable of gripping a peripheral surface of the pipe 22.

As illustrated by FIGS. 1 and 2, the first assembly 24 comprises a plurality of mooring assemblies 38 distributed around the buoy 26. In particular, it comprises several pairs 72A to 72D of adjacent mooring assemblies 38.

A first pair 72A and a second pair 72B are respectively transversely fastened on the longitudinal boxes 32, on the surface of said boxes 32 situated away from the axis A-A'.

Two pairs 72C, 72D protrude longitudinally relative to the rear end 40 of each longitudinal box 32.

As illustrated by FIG. 1, the number of anchoring lines 30 is advantageously equal to the number of mooring assemblies 28.

Each line 30 comprises, from top to bottom in FIG. 1, a head 80 for fastening on the buoy 26, an upper section 82 formed by a cable, and according to the invention, a lower section 84 formed by a chain.

As illustrated by FIG. 7, the fastening head 80 comprises a connecting ring 86, a flexible cone 88 for engaging in the receptacle 60, and a stiffening tube 90 intended to be grasped by the jaws 70 of the gripping arm 62.

The cone 88 has an outer peripheral surface with a shape complementary to that of the tapered cavity 66. In this way, when the buoy 26 is stressed upward under the effect of its buoyancy, it is retained vertically by the contact between the conical stop 88 and the receptacle 60.

The tube 90 is more rigid than the upper section 82. It extends over a length smaller than 10% of the length of the anchoring line 30, taken between the fastening head 80 and the lower end (not visible) of the lower section 84.

The upper section 82 is for example made from a cable consisting of a strand or rope of metal or synthetic wires, designated using the terms "wire rope" or "synthetic rope."

The lower section 84 forms a chain of closed links 92 assembled together.

In a known manner, the successive links 92 of the chain are oriented in planes perpendicular to one another when the lower section 84 is kept vertically stressed.

The length of each link is greater than 400 mm and the width of each link is greater than 200 mm.

The length of the lower section 84 is less than 20% of the length of the anchoring line 30, as defined above. This length is for example comprised between 5 m and 20 m.

The lower section 84 is fastened to a lower end 94 of the upper section 82. In this example, this fastening is permanent.

As illustrated by FIG. 1, the anchoring lines 30 are arranged in pairs. They are kept substantially vertically stressed when they are connected on the one hand to the buoy 26, and on the other hand to the anchoring assemblies 38.

In reference to FIGS. 3 to 6, each anchoring assembly 28 comprises a base 100 attached to the bed of the expanse of water, and at least one device 110 for guiding an anchoring line 30 mounted on the base 100.

Each anchoring assembly 28 also comprises means 112 for fastening the or each guide device 110 on the base 100 and, for each line 30, a locking member 114 which can be released from the line 30 in its vertical position.

Figure 3:
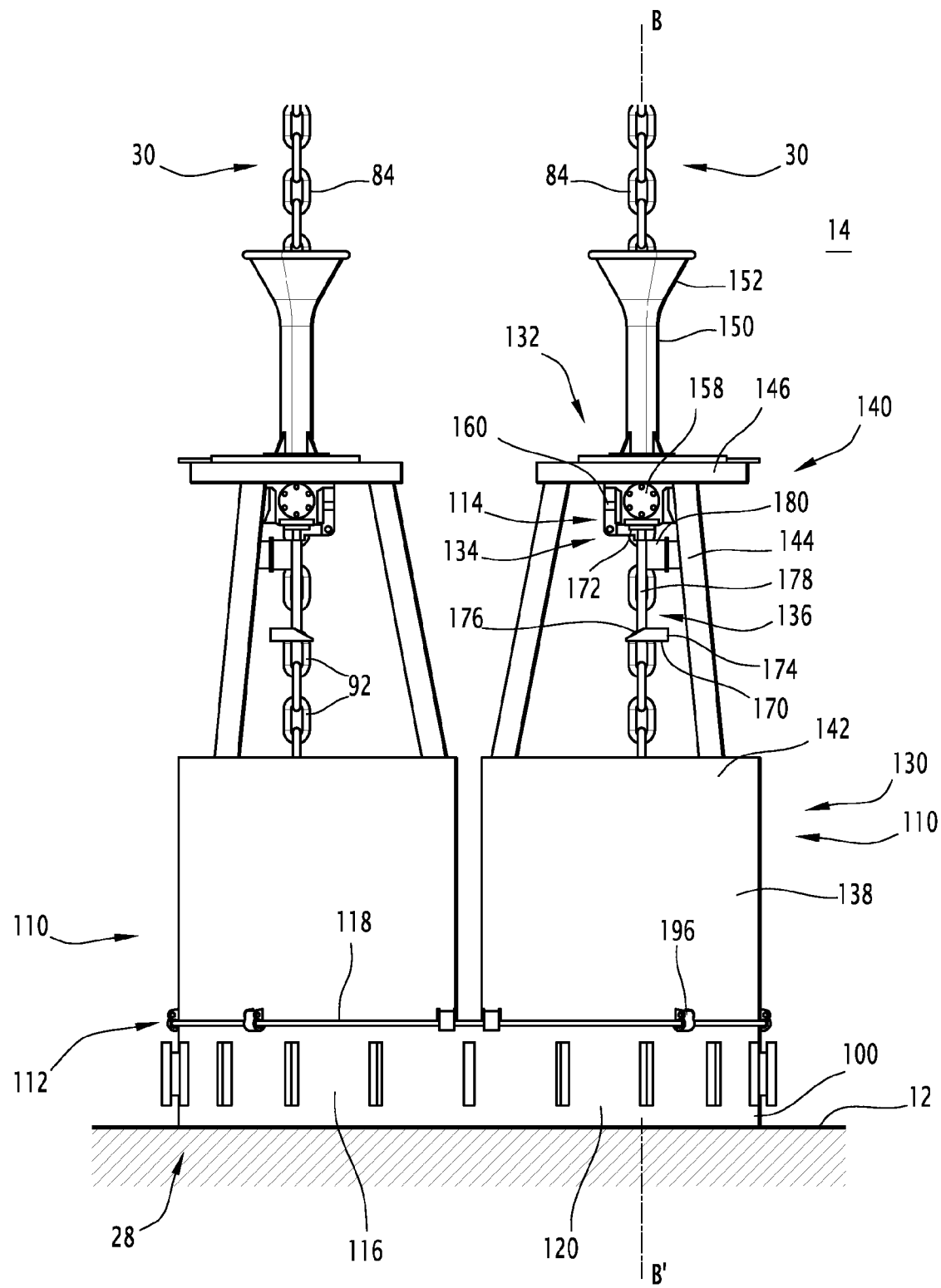
FIG. 3 is a side view of an anchoring element of the supporting buoy shown in FIG. 2.
Figure 4:
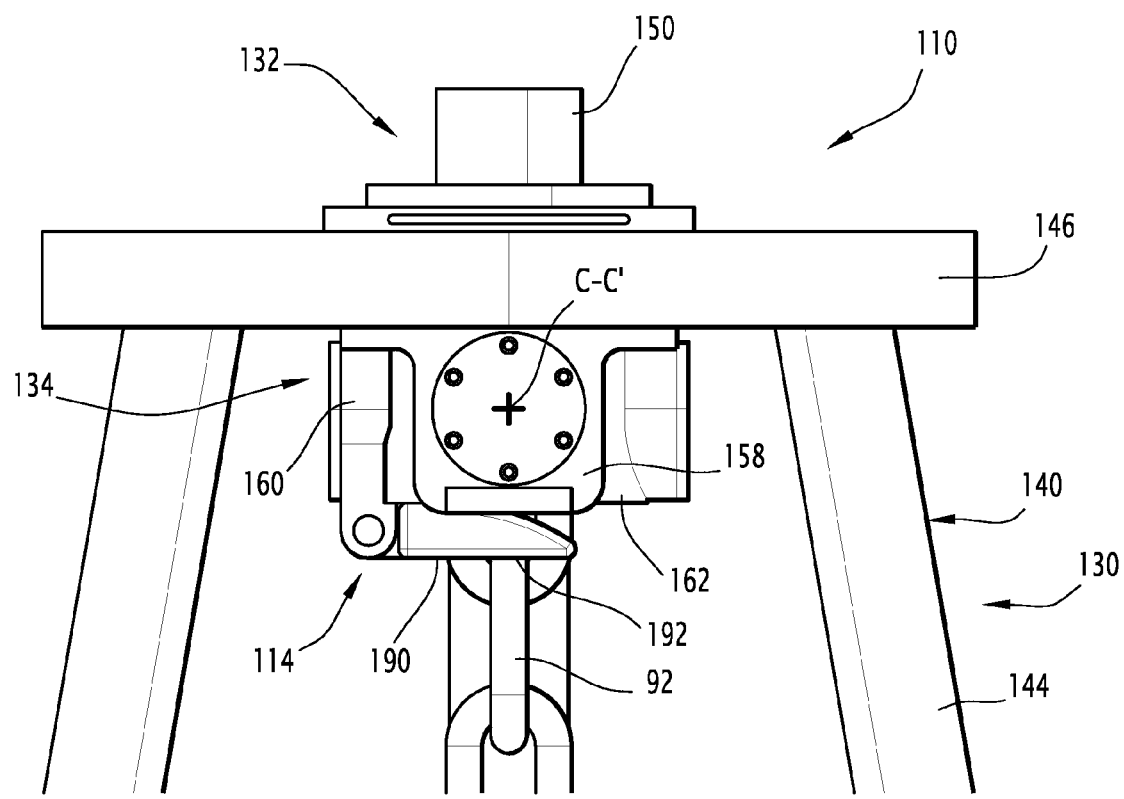
FIG. 4 is an enlarged view of a detail marked IV of the device for guiding and retaining the anchoring element shown in FIG. 3.

In the example illustrated in FIG. 3, the base 100 is shared by two devices 110 for guiding two adjacent anchoring lines 30.

The base 100 advantageously comprises a substantially cylindrical pile 116, partially inserted into the bed of the expanse of water 12.

The pile 116 delimits an upper bearing wall 118 of the guide devices and a side wall 120 delimiting an inner volume opening downwards.

The pile 116 is advantageously a suction pile provided with at least one suction valve (not shown) for the inner volume.

Alternatively, the base 100 comprises a gravitational base plate, a torpedo pile, or an anchor.

The guide device 110 comprises a stationary framework 130 and a guide member 132, articulated on the stationary framework 130 by means of a Cardan joint 134.

In this example, the guide device 110 also includes a traction mechanism 136 for the lower section 84 of the anchoring line 30.

The stationary framework 130 includes a base box 138 secured on the pile 116, and a support tripod 140 intended to support the guide member 132, the tripod 140 protruding upward from the base box 138.

The base box 138 is hollow. It inwardly defines a reservoir 142 for receiving ballast, which can also receive the portion of the lower section 84 that is not vertically suspended under the upper section 82.

The tripod 140 comprises a plurality of legs 144 and a support plate 146 positioned away from and above the box 138.

Figure 6:
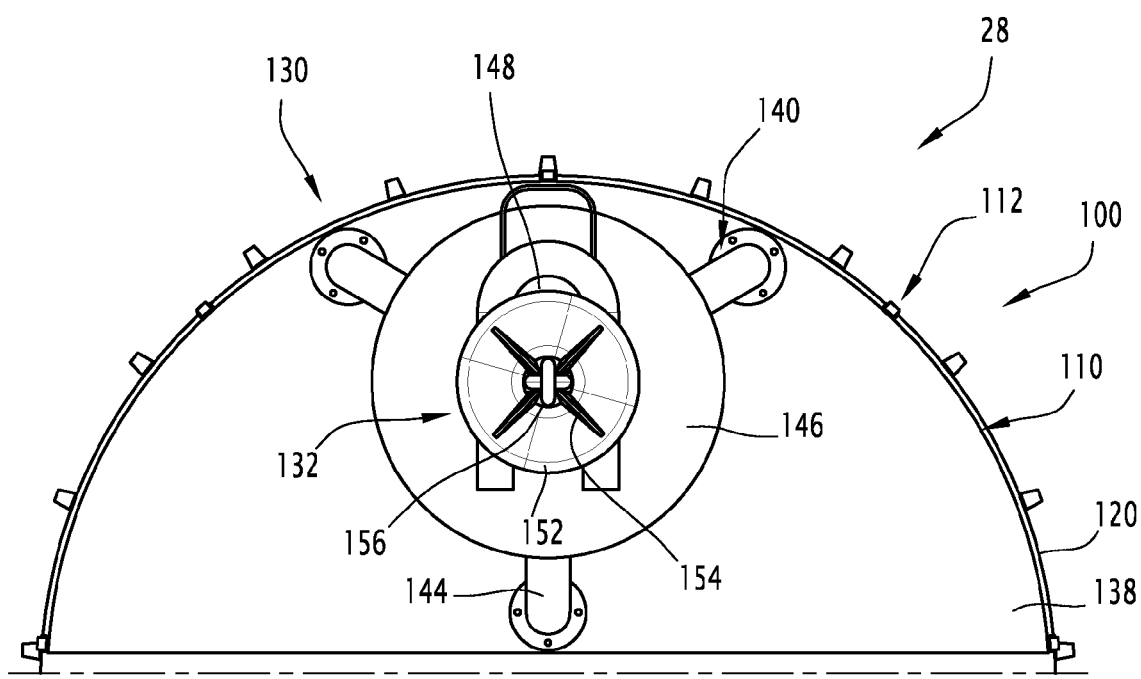
FIG. 6 is a partial top view of the anchoring element shown in FIG. 3.

As illustrated by FIGS. 3 and 6, the legs 144 extend at an incline relative to a vertical axis to converge toward the plate 146, so as to ensure good reaction of the forces applied on the device 110.

The plate 146 delimits an inner slot 148 extending longitudinally parallel to the axis A-A'.

The slot 148 allows the relative movements of the guide member 132 in relation to the framework 130 and the base 100, at least in a longitudinal direction.

The height separating the plate 146 from the box 142 is greater than at least the height of four successive chain links 92 on the lower section 84.

Figure 5:
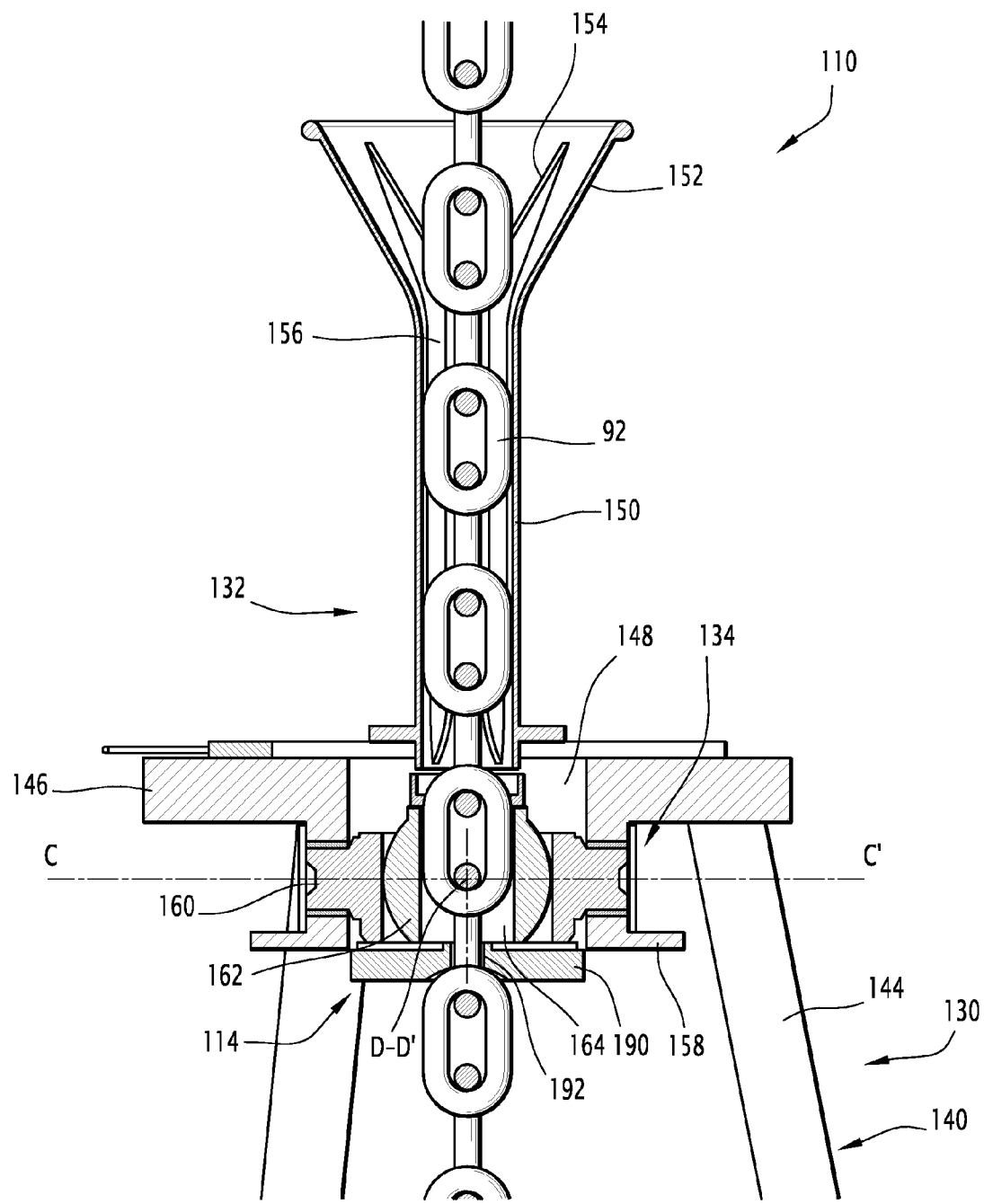
FIG. 5 is a cross-sectional view along a median vertical plane of the detail shown in FIG. 4.

In reference to FIGS. 3 and 5, the guide member 132 includes a tubular guide sleeve 150, extended upwardly by a funnel 152 for inserting the lower section 84. The guide member 132 also comprises at least one inner rib 154 for angularly indexing the lower section 84 around a vertical insertion axis B-B'.

The guide sleeve 150 is fastened on the Cardan joint 134. It protrudes upward through the slot 148 above the plate 146. The length of the guide tube 150 is greater than the height of a chain link 92, advantageously greater than the height of at least three chain links 92 kept vertically engaged in one another.

The funnel 152 diversions upwardly away from the guide tube 150. As will be seen below, the funnel 152 is intended to facilitate the reception of the lower end of the lower section 84 when the line 30 is connected.

The funnel 152 and the guide tube 150 inwardly define a substantially vertical passage 156 for the circulation of the lower section 84. The passage 156 extends along the axis B-B' and emerges upwardly through the funnel 152 and downwardly, through the lower end of the tube 150.

The guide ribs 154 protrude vertically in the passage 156 from the guide tube 150 and the funnel 152. They are angularly distributed around the axis B-B' to define an intersection of the cross-shaped passage 156.

This arrangement of the ribs 154 makes it possible to angularly index the successive chain links 92 positioned at a right angle of the lower section 84, when the section 84 is inserted into the guide member 132.

In reference to FIG. 5, the Cardan joint 134 comprises an outer yoke 158 fastened under the plate 146, an outer rotary member 160 rotatably mounted in the yoke 158 around a first horizontal axis C-C', and a second inner rotary member 162 rotatably mounted in the outer rotary member 160 around an axis D-D' perpendicular to the axis C-C'.

The guide tube 150 of the guide member 132 is fastened on the inner rotary member 162.

The inner rotary member 162 delimits a vertical passage 164 in which the vertical passage 156 of the guide member 132 emerges.

In this way, the guide member 132 is mounted rotatably relative to the stationary framework 130, around two horizontal perpendicular axes of rotation C-C' and D-D'.

Owing to this articulation of the guide member 132, the guide tube 150 and the funnel 152 can be moved in the slot 148 to absorb the horizontal movements of the supporting buoy 26, which can cause an incline of the lines 30 relative to a vertical axis.

The maximum angular travel of the guide member 132 relative to the vertical is at least 30°, advantageously at least 40° around the two axes B-B' and C-C' in the two directions of rotation.

As illustrated by FIG. 3, the traction mechanism 136 comprises a member 170 for engaging the lower section 84 and a cylinder 172 for moving the engagement member 170 along the axis B-B'.

The engagement member 170 includes a fork delimiting two fingers 174 for application on a chain link 92, and a slot 176 for inserting a chain link 92 between the fingers 174.

The cylinder 172 includes two parallel cylinder rods 178 connected to one another by an actuating handle 180 that may advantageously be grasped by an outside remote-controlled vehicle to actuate the rods 178.

The engagement member 170 is fastened to the lower end of the rods 178 to be jointly movable with the rods 178 relative to the framework 130.

The rods 178 can be translated parallel to the axis B-B' of the guide member 132 between a retracted upper position and a deployed lower position for pulling the lower section 84 toward the base 100.

In this example, the movement of the rods 178 is caused by moving the handle 180 downward. Alternatively, the rods 178 are hydraulically actuated using an actuating medium.

The locking member 114 is capable of keeping the lower section 84 in position relative to the guide device 110.

The member 114 for locking the lower section 84 in position is formed by a fork with a structure similar to that of the engagement member 180. The member 114 thus has two fingers 190 delimiting a slot 192 between them for inserting a link 92.

The locking member 114 is mounted pivotably relative to the framework 130 between a locking position substantially perpendicular to the axis B-B' and a position freeing the passage of the lower section 84 that is inclined or parallel to the axis B-B'. In this example, the locking member 116 is articulated on the yoke 158 of the Cardan joint 134.

In the locking position, the fingers 190 are positioned upwardly bearing against the yoke 158. The yoke 158 forms a stop for blocking the upward rotation of the locking member 114, in particular when a link 92 of the chain is applied under the finger 190 and the section 84 is stressed upward by the traction of the buoy 26.

In this position, the upward movement of the section 84 is blocked by the member 114.

In the release position, the fingers 94 have moved downwardly away from the yoke 158 to occupy a position that is tilted or parallel to the axis B-B'. The section 84 is free to move downward along the axis B-B' while sliding on an upper surface of the fingers 190.

The lower section 84 can be moved relative to the base 100 through the guide member 132, when the support assembly 24 is put in place, between a deployed configuration, in which the length of the section 84 protruding vertically above the base 100 is maximal, and a contracted configuration on the base 100, in which the height of the section 84 that protrudes above the base 100 is minimal.

During this movement, the links 92 of the lower section 84 slide along the axis B-B' in the inner passage 156 of the guide member 132 and advantageously through the inner rotary member 162 of the Cardan joint 134, to descend toward the inner volume 142 of the box 138.

The downward movement of the section 84 is advantageously caused by actuating the cylinder 172 to move the engagement member 170 downward. This movement requires that the locking member 114 be released.

The means 112 for fastening the device 110 on the base 100 include hooks 196 advantageously secured to the base 100, and intended to hook on the stationary framework 130 of each guide device 110.

The hooks 196 are distributed on the periphery of the upper wall 118.

Each fluid transport pipe 22 comprises a lower section 200 positioned in a small chain between the bed assembly 18 and the supporting buoy 26, and a flexible upper section 202 in the shape of a wave, positioned between the supporting buoy 26 and the surface assembly 20.

The lower end of the lower section 200 is connected to the bed assembly 18. In the example shown in FIG. 2, it has an upper end 204 connected on a connecting arm 48.

The lower section 200 is advantageously formed by a flexible or semi-rigid pipe. In this example, the upper section is formed by a flexible pipe of the unbound type by the companies FLEXI FRANCE or FLEXIBRAS as defined by standards API 17J or API RP 17B.

The upper section 202 comprises an upstream portion 206 positioned bearing on the upper surface 50 of the arch 44 and engaged through the gutter 46, and a J-shaped downstream portion 208 extending between the arch 44 and the surface assembly 20 through the expanse of water 14.

A first method for mounting the facility 10 according to the invention will now be described.

Figure 8:
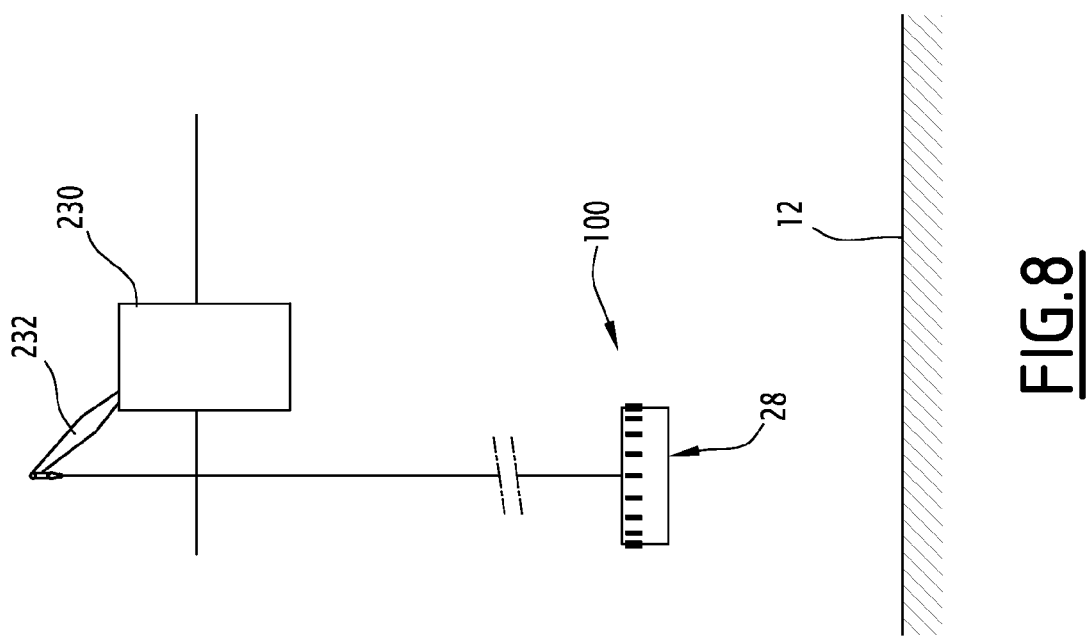

Initially, as shown in FIG. 8, each base 100 is brought, using a placement vessel 230, across from the region of the bed 12 of the expanse of water 14 on which it must be placed.

The base 100 is then lowered using a crane 232 to be placed, then anchored in the bed 12.

The side wall 120 of the pile 116 then partially penetrates the bed of the expanse of water 12 and the suction valves are connected to a vacuum pump to suction the volume of gas present under the upper wall 118 between the side wall 120 of the pile 116.

Figure 9:
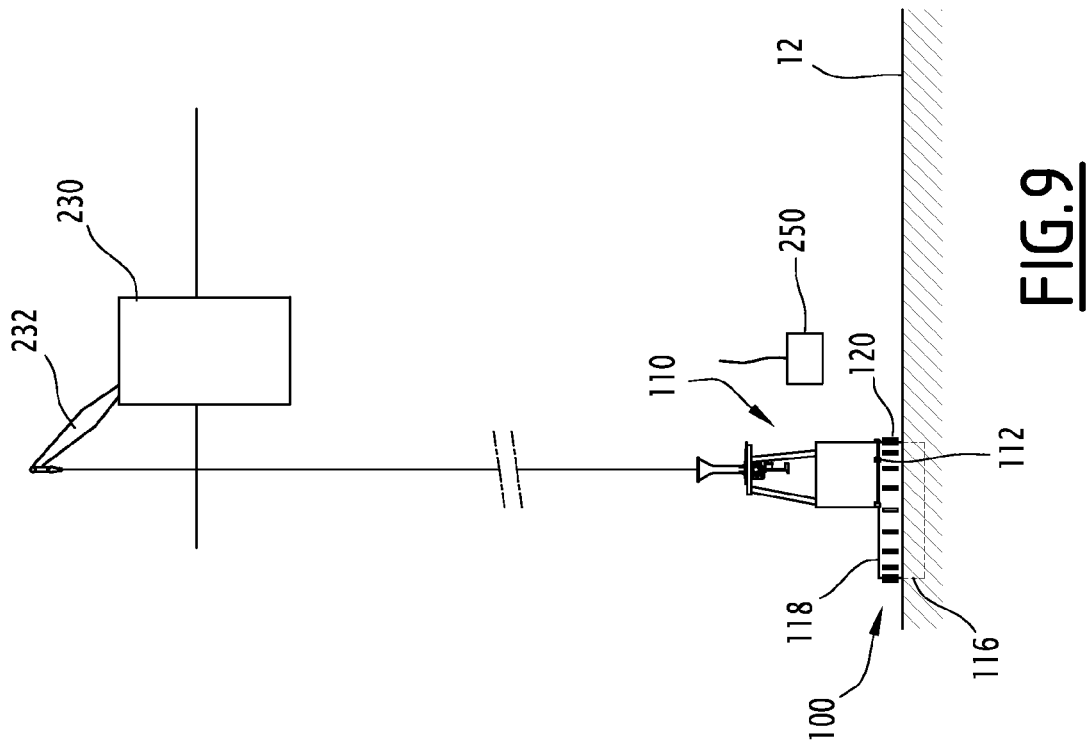

To that end, for each base 100, a first guide device 110 is lowered into the expanse of water from a placement vessel 230. The guide device 110 is placed on the base 100 and is attached to the base 100 using hooks 196 of the fastening means 112, as shown in FIG. 9.

Then, a first group of anchoring lines 30 is placed.

On the placement vessel 230, the lower section 84 of an anchoring line 30 is connected on a second guide device 110.

To that end, the links 92 of the lower section 84 are inserted into the guide member 132 through the funnel 152, then through the guide tube 150 while being angularly oriented around the axis B-B' by the guide ribs 154.

The section 84 is then partially lowered into the base box 138 of the stationary framework 130, then the locking member 114 is activated to block the lower section 84 in axial position along the vertical axis B-B' relative to the guide device 110.

Once this is done, the second guide device 110 hooked to the lower end 94 of the section 82 is lowered toward the base 100, as shown in FIG. 10.

A temporary float 234 is connected to the upper end of the line 30 between the crane 232 and the line 30.

The crane 232 is then maneuvered to completely submerge the second guide device 110, the line 30 and the float 234, and to place them substantially vertically until the second guide device 110 is pressed against the base 100 on the side of the first guide device 110 previously installed on said base 100.

Figure 11:
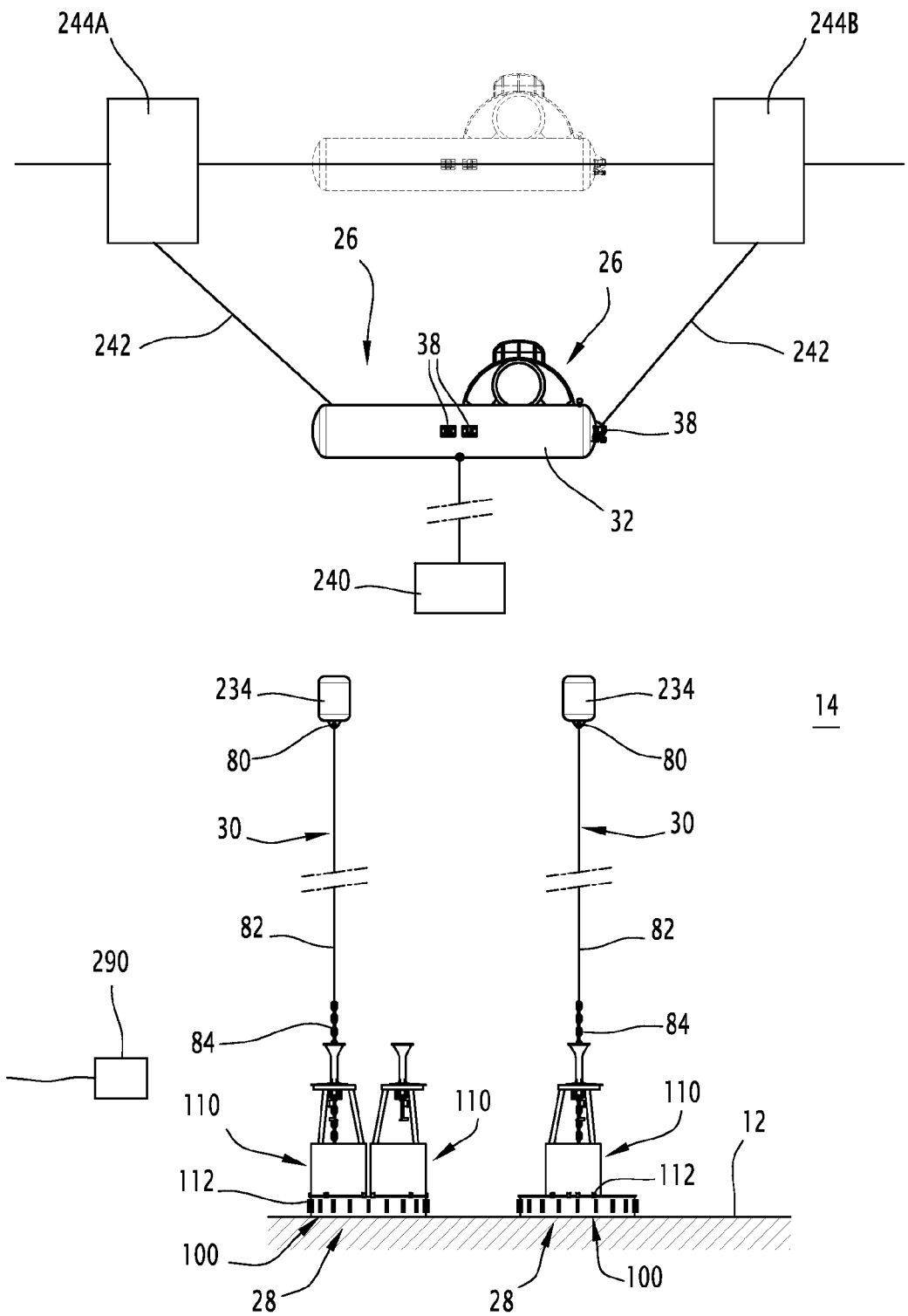

Then, as shown in FIG. 11, the second guide device 110 is hooked on the base 100 using fastening means 112.

The float 234 is then freed from the crane 232. Under the effect of its buoyancy, the float 234 keeps the line 30 in a vertical configuration above the base 100.

When all of the lines 30 of the first group of lines 30 are installed, advantageously when an anchoring line 30 is installed for each base 100, the supporting buoy 26 is transported across from the anchoring assemblies 28 in the bed 12 of the expanse of water 14 while being partially submerged on the surface 16 of the expanse of water 14, as shown in broken lines in FIG. 11.

Then, in a known manner, a ballast element 240 is fastened under the buoy 26 to lower it toward the anchoring lines 30. During this lowering, the buoy 26 is suspended from two ropes 242 respectively carried by placement vessels 244A, 244B.

The buoy 26 is then positioned between the heads 80 of the lines 30 previously installed. The fastening head 80 of each line 30 is then inserted into a respective mooring assembly 38. To that end, the conical stop 88 is inserted into a receptacle 60 and the tube 90 situated under the stop 88 is received in a gripping arm 62.

Once this placement is done, the ballast element 240 is detached from the supporting buoy 26 and is brought back to the surface using a placement vessel 244A, 244B.

The buoy 26 is then advantageously deballasted by pumping a gas inside the boxes 32, 34 to increase its buoyancy. The buoy 26 is then stressed toward the surface 16 under the effect of its own buoyancy.

The buoy 26 is, however, kept completely submerged in a substantially horizontal position by each anchoring line 30, which stretches vertically between the anchoring element 28 and the buoy 26.

The vertical retention of the buoy 26 is in particular ensured by the cooperation between the conical stop 88 and the receptacle 60.

Then, the tension and the length of each line 30 are adjusted using the guide device 110 to adjust the vertical position of the buoy 26.

To that end, for each line 30, the height of the lower sections 84 protruding above the base 100 is adjusted using the traction mechanism 136.

An underwater remote-controlled vehicle 250 is then lowered across from the traction mechanism 136 to actuate the handle 180 of each cylinder 172 and cause the rods 178 and the engagement member 172 to be jointly lowered toward the base 100, after releasing the locking member 114.

An increasing length of the section 84 is thus taken into the box 138 until the desired tension and length are obtained on the line 30. The locking member 114 is then replaced to maintain the vertical position of the section 84.

Once the height of the section 84 and the tension applied on the line 30 are adjusted, a second group of anchoring lines 30 is fastened between the anchoring assemblies 28 and the supporting buoy 26.

To that end, as shown in FIG. 12, the line 30 is lowered at its upper end by the crane 232, and at its lower end 92 by an auxiliary rope 236. The line 30 is first inserted into a mooring assembly 38, then the lower section 84 is guided toward the first guide device 110 by means of the rope 236.

The links 92 of the section 84 are then inserted into the guide member 132 successively through the funnel 152, the guide tube 150, and are extracted through the passage 156 up to the base box 138.

The locking member 114 is then activated by engaging the fingers 190 on the lower section 84. As previously described, the height of the base section 84 protruding above the base 100 is then adjusted using the traction mechanism 136.

The presence of a guide device 110, provided with a traction mechanism 136 and a releasable locking member 114, therefore makes it possible, in combination with the structure of each anchoring line 30, to simply and precisely adjust the position of the submerged supporting buoy 26, and the active length of each line 30. This facilitates the installation and later use of the support assembly 24 and prevents the tension applied on each anchoring line 30 from going beyond the defined specifications.

The installation of the transport pipes 22 on the intermediate assembly 24 will now be described.

Figure 13:
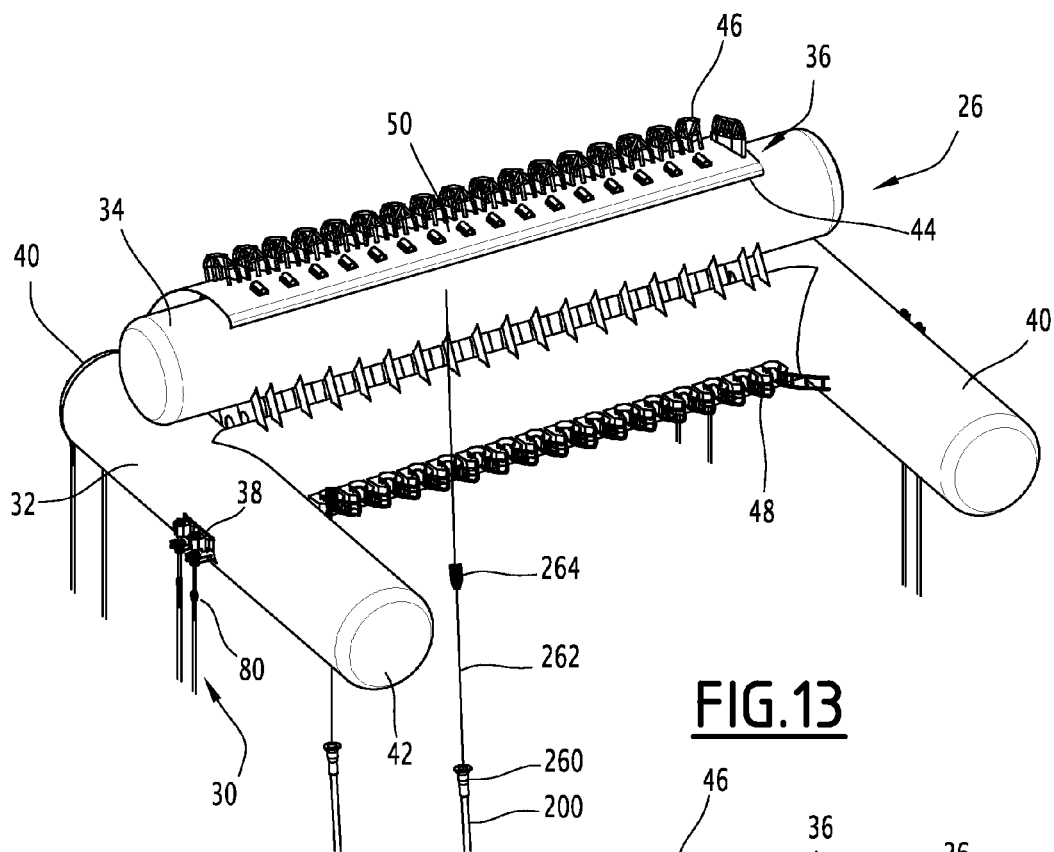
FIGS. 13 to 16 are partial perspective three-quarters front views of the supporting buoy, during successive steps of the method for placing the fluid transport pipes on the supporting buoy.

Initially, in reference to FIG. 13, the lower section 200 of the pipe 22 is placed on the bed 12 of the expanse of water 14. It is hung in a small chain by its upper end 260 using a traction cable 262 provided with an attachment stop 264 on the submerged buoy 26.

The stop 264 is positioned at a small distance from the end of the lower section 200, for example a distance smaller than 10% of the length of the section 200.

The cable 262 has a greater flexibility than that of the lower section 200. It can therefore be oriented substantially vertically when the lower section 200 is hung in a small chain at its lower end.

The stop 264 is then placed in a connecting arm 48 to temporarily keep the lower section 200 suspended under the buoy 26 using the cable 262.

Figure 14:
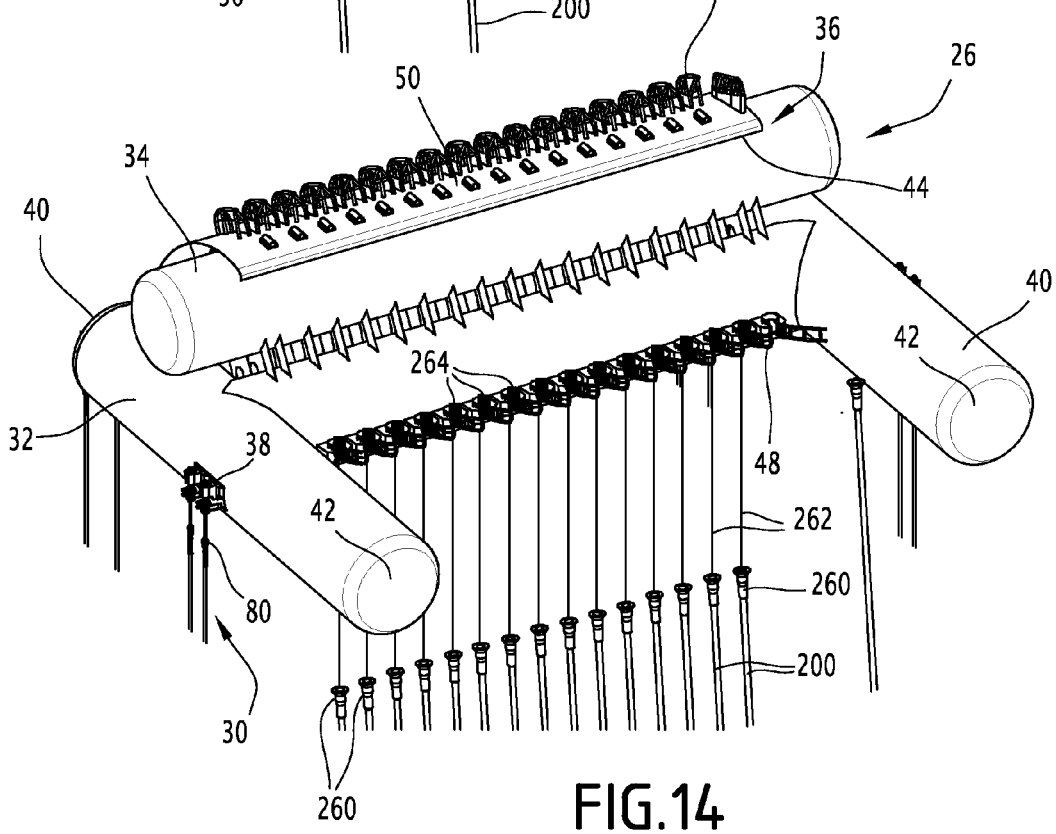

Then, as illustrated by FIG. 14, all of the stops 264 of the traction cables 262 of the different lower sections 200 are successively put in place in parallel in the connecting arms 48 adjacent to the buoy 26.

Thus, given the deformability of each cable 262, the angular incline tolerance of the stop 264 relative to a vertical axis may be minimized, for example to a value below 6°. The design of the connecting arms 48 is facilitated.

Furthermore, the buoy 26 does not undergo angular stress forces during the placement in parallel of the various lower sections 200.

Figure 15:
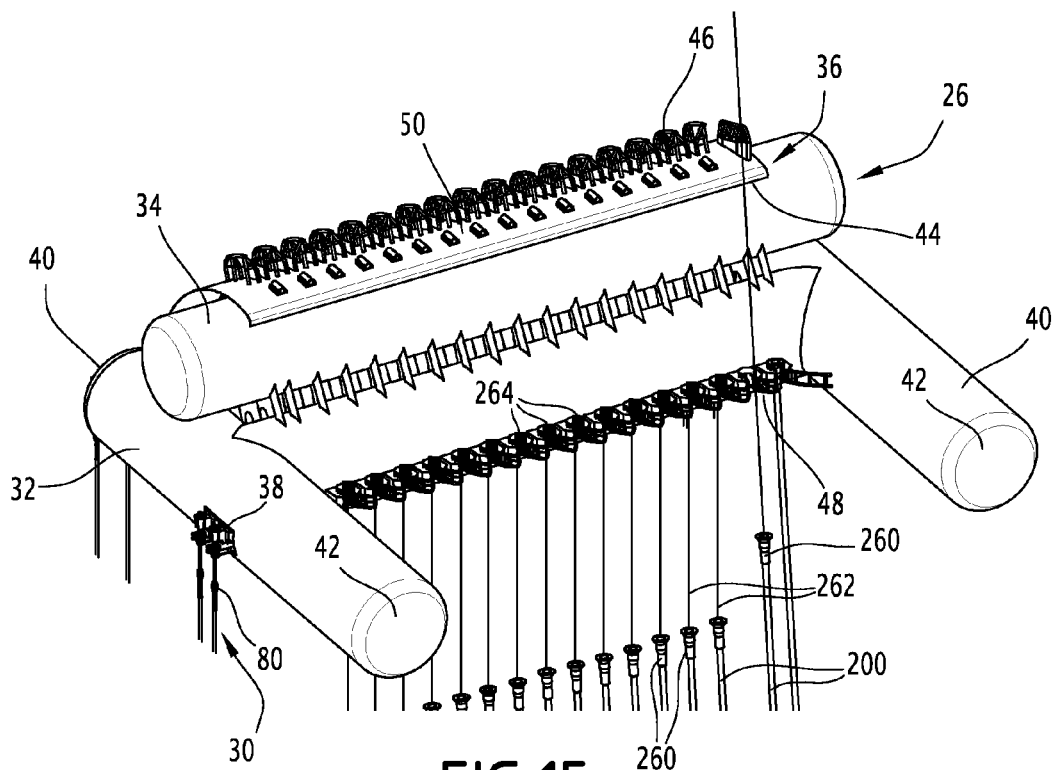
Figure 16:
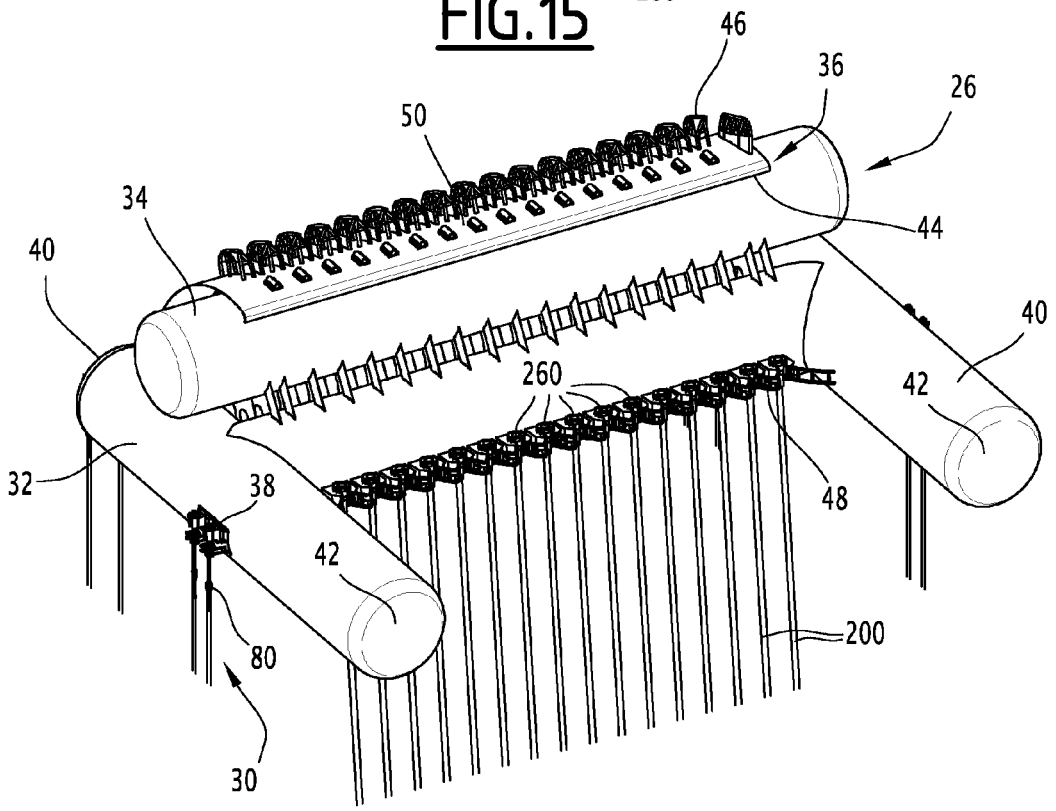

Then, once all of the lower sections 200 are hung under the buoy 26, each section 200 is successively pulled toward the connecting arm 48 by traction on the cable 262, as illustrated by FIG. 15. The upper end of each section 200 is then fastened in the connecting arm 48.

The flexible upper sections 202 are then lowered from the surface. Each upper section 202 is positioned bearing on the upper surface 50 of the supporting arch 44 to be connected to each lower section 200.

Once the connection is done, it is possible to circulate fluid through each pipe 12 from the bed assembly 12 successively through the lower section 200 to the supporting buoy 26, then through the upper section 202, between the buoy 26 and the surface assembly 20.

Figure 17:
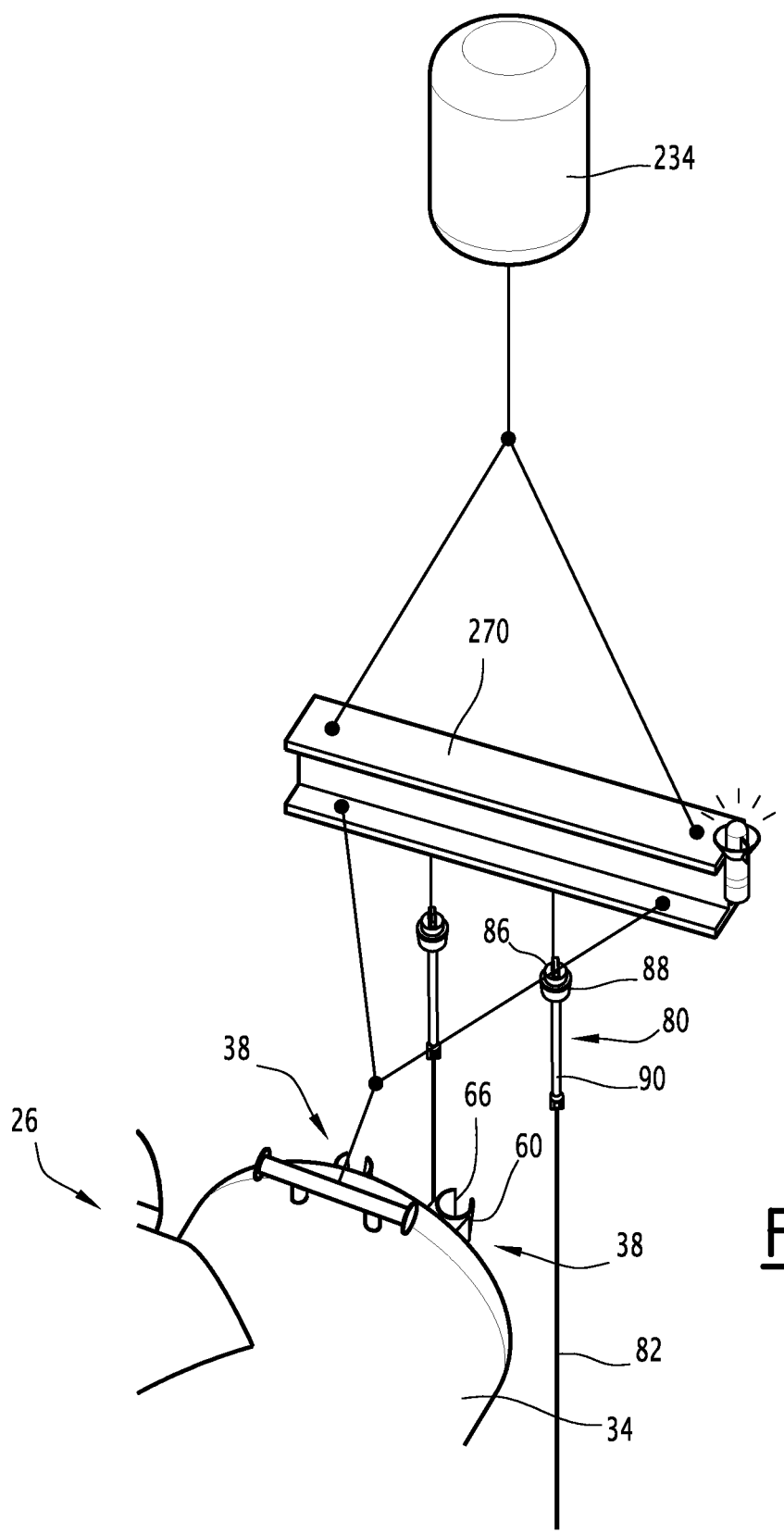
FIG. 17 is a top perspective view of a step for fastening the anchoring line according to the invention, in one alternative placement method according to the invention.

In one alternative installation method, shown in FIG. 17, at least two adjacent anchoring lines 30 are connected to a single float 234 during placement of the buoy 26.

To that end, the lines 30 are hung from a horizontal spacer beam 270 to be positioned parallel to one another at a distance corresponding to the distance separating the receptacles 60 of two adjacent mooring assemblies 38.

In this alternative, the guide devices 110 connected to the same base 100 are successively lowered into the expanse of water to be fastened on the base 100, independently of the anchoring lines 30, without receiving a lower section 84.

Then, the lower sections 84 of the two parallel lines 30, supported by the float 234 and the beam 270, are inserted into the guide device 110 and are respectively fastened by the locking members 114 of each device 110.

Next, the assembly formed by the float 234, the beam 270, and the fastening heads 80 of the lines 30 is pulled substantially horizontally toward the mooring assemblies 38. The heads 80 are then simultaneously inserted into the corresponding receptacles 66.

The adjustment of the tension and the active length of each anchoring line 30 is then done as previously described.

Figure 18:
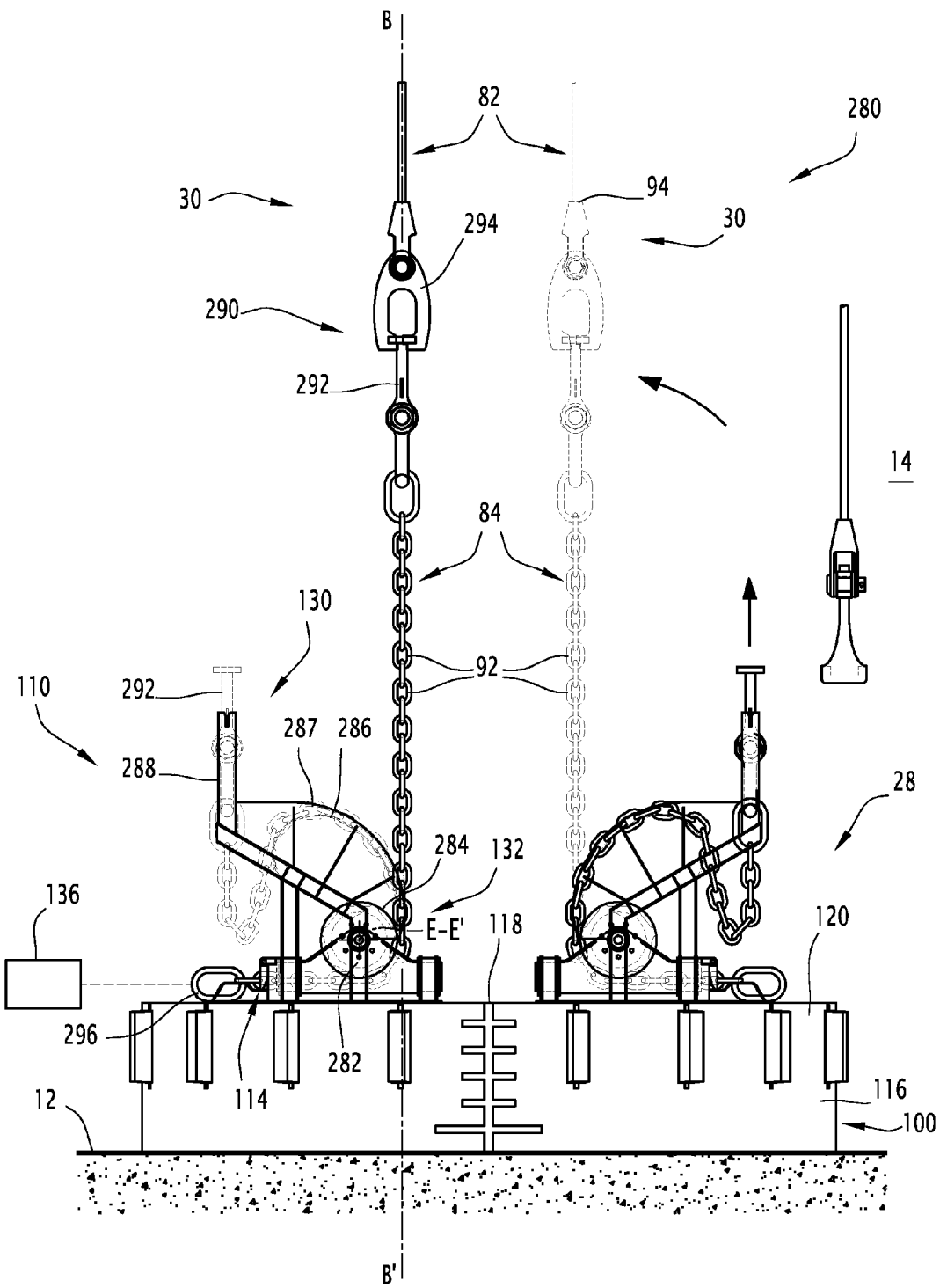
FIG. 18 is a view similar to FIG. 3 of the anchoring element of a second facility according to the invention.

The guide device 110 for a second assembly 280 according to the invention is shown in FIG. 18.

The device 110 includes a notched guide pulley 282, rotatably mounted on the framework 130 around a horizontal axis E-E'.

The pulley 282 includes notches 284 capable of engaging in the different chain links 92. The notches 284 protrude radially into the groove of the pulley 282.

The framework 130 includes a chain support gutter 286 delimiting a concave chain support surface 287 situated above the pulley 282. The framework 130 also comprises a support base 286 for supporting an upper end of the section 84, which protrudes upward and laterally away from the pulley 282.

The releasable locking member 114 is also supported by the framework 130 while being positioned across from the upper wall 118.

The pulling mechanism 136 is formed by a winch independent from the anchoring assembly 28. The winch may be raised to the surface once the tension and the length of the lower section 84 are adjusted.

In this embodiment, the lower section 84 is removably connected to the upper section 82 using a connector 290. In the example illustrated in FIG. 18, the connector 290 includes a connection head 292 secured on the upper end of the lower section 84 and capable of being engaged by a bush 294 secured to the lower end of the section 82.

The head 292 is received, when idle, on the support base 288.

Advantageously, the head 292 and the bush 294 are of the "Delmar" type.

The mounting of the second assembly 280 differs from the mounting of the first assembly 24 in that initially, the lower section 84 is supported when idle by the guide device 110.

In this configuration, the head 292 is received on the base 288. The chain links 92 next extend over the support gutter 286, then pass around the pulley 282 while being engaged in the notches 284 before entering the locking member 114.

The upper section 82 is then lowered into the expanse of water as previously described. The bush 294 for grasping the heads 292 is brought close to the base 288 to grasp that head 292 and connect the upper section 82 to the lower section 84.

Then, as shown on the left in FIG. 18, an upward pulling force is exerted on the upper section 82, to raise the connector 290 and move it away from the base 100 above the pulley 282.

The lower section 84 is then removed from the gutter 286 and is stretched vertically in the axis B-B' of the upper section 82.

To adjust the protruding height of the section 84 above the base 100, a traction mechanism 134 is connected to the lower end 296 of the lower section 84. The locking member 114 is then disengaged from the section 84 and the traction mechanism 136 pulls on the lower section 84 to adjust the actual height of the section 84 protruding above the base 100. During this movement, the section 84 is guided by the pulley 282.

Once the desired height and tension are adjusted on the line 30, the locking member 114 is reengaged on the lower section 84, and the traction mechanism 136 is disconnected.

Figure 19:
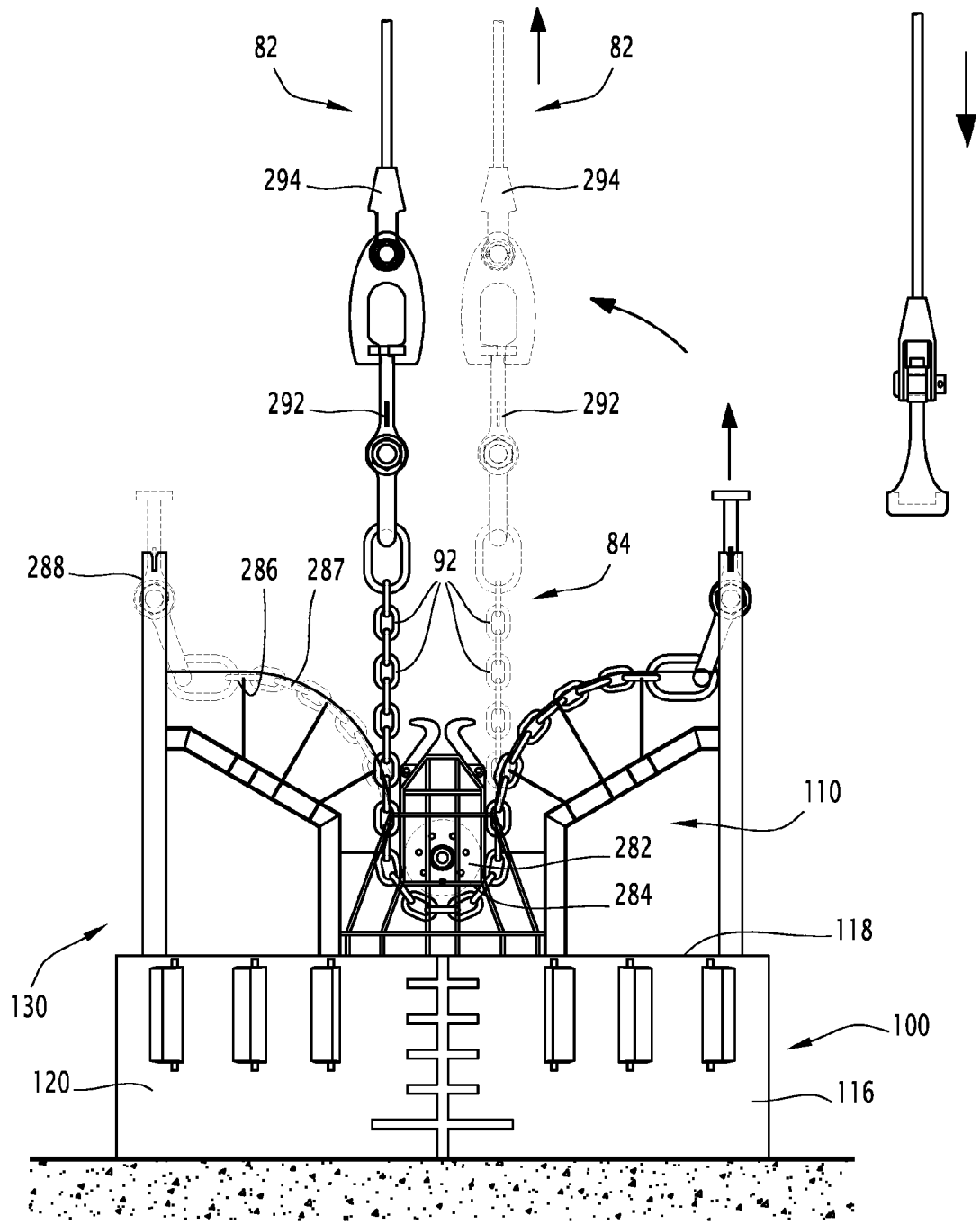
FIG. 19 is a view similar to FIG. 3 of the anchoring element of a third facility according to the invention.

In the support assembly 298 shown in FIG. 19, the lower sections 84 of two adjacent lines 30 are shared.

Unlike the second assembly 280 shown in FIG. 7, this assembly 298 includes a notched pulley 282 shared by two guide assemblies 110 to receive the single chain forming the lower section 84 of two adjacent lines 30. The tension and height of each line 30 are adjusted relatively between the lines 30 by moving the section 84 around the pulley 282.

In one alternative (not shown) the submerged support assembly comprises a device for guiding an upper section of the anchoring line 30 supported by the supporting buoy 26. The upper section of the anchoring line is advantageously formed by chain links.

The upper section is movably mounted in the guide device relative to the buoy 26 between a deployed configuration, in which the height of the anchoring line 30 protruding above the base 100 is maximal, and a contracted configuration in which the height of the anchoring line 30 above the base 100 is minimal. The submerged assembly then comprises a releasable locking member 114 for locking the line 30 on the buoy in its vertical position.

In this alternative, the guide device is similar to the guide devices 110 described above. The line 30 is not necessarily provided with a lower section formed by chain links 92 and the anchoring assembly 28 does not necessarily include a guide device 110 supported by the base 100.

What is claimed is:

1. A submerged assembly for supporting at least one fluid transport pipe through an expanse of water, of the type comprising:

a supporting buoy intended to be completely submerged in the expanse of water, the buoy being kept spaced away from the bed of the expanse of water under the effect of its own buoyancy, the buoy including at least one pipe bearing surface;

at least one anchoring assembly comprising a base designed to be attached to the bed of the expanse of water;

at least one flexible anchoring line connecting the anchoring assembly to the supporting buoy;

the anchoring line comprising at least one lower section, wherein the anchoring assembly comprises:

a guide for guiding the lower section, the lower section being movably mounted in the guide relative to the base, between an extended configuration, in which the height of the anchoring line protruding above the base is maximal, and a contracted configuration, in which the height of the anchoring line above the base is minimal; and a releasable locking member of the anchoring line on the anchoring assembly, the locking member being configured to maintain a desired height at the anchoring line between the contracted configuration and the extended configuration.

2. The support assembly according to claim 1, wherein the lower section of the anchoring line is made from chain links.

3. The support assembly according to claim 1, wherein the anchoring line includes an upper section made from a cable, the length of the lower section advantageously being less than 20% of the length of the upper section.

4. The support assembly according to claim 1, wherein the guide comprises a tubular member for passage of the lower section, the lower section being engaged through a passage formed in the tubular member.

5. The support assembly according to claim 4, wherein the tubular member comprises at least one angular indexing member of the lower section relative to a circulation axis of the lower section in the passage, the angular indexing member protruding in the passage.

6. The support assembly according to claim 4, wherein the tubular member defines an upper guide surface diverging upward away from the base.

7. The support assembly according to claim 4, wherein the guide comprises a stationary framework, the tubular member being articulated relative to the stationary framework around at least one substantially horizontal axis of rotation.

8. The support assembly according to claim 7, wherein the releasable locking member can be jointly rotated with the tubular member relative to the stationary framework.

9. The support assembly according to claim 1, wherein the guide comprises at least one traction mechanism of the lower section capable of moving the lower section toward the contracted configuration thereof.

10. The support assembly according to claim 1, wherein the releasable locking member is movably mounted relative to the lower section between a position disengaged from the lower section and a position engaged on the lower section.

11. The support assembly according to claim 1, wherein the guide comprises at least one guide pulley provided with attachment members of the lower section, the support assembly comprising at least one traction mechanism of the lower section positioned away from the anchoring assembly.

12. The support assembly according to claim 1, wherein the guide is removably mounted on the base.

13. The support assembly according to claim 1, wherein the locking member is supported by the base of the anchoring assembly.

14. A facility for exploiting a fluid through an expanse of water, of the type comprising:
   a bed assembly, secured to the bed of the expanse of water;
   a surface assembly at least partially extending above the surface of the expanse of water;
   a support assembly according to claim 1;
   at least one fluid transport pipe connecting the bed assembly to the surface assembly, at least one section of the transport pipe being positioned bearing on the supporting surface of the buoy.

15. A method for placing a facility for exploiting a fluid according to claim 14, comprising the following steps:
   completely submerging the supporting buoy of the support assembly;
   fastening the or each anchoring line on the anchoring assembly, and on the supporting buoy;
   moving the lower section of the anchoring line relative to the anchoring assembly through the guide, to adjust the height of the anchoring line protruding above the base;
   engaging the locking member on the anchoring line to keep the anchoring line in a vertical position relative to the anchoring assembly.

16. The method according to claim 15, wherein the fastening step comprises temporarily fastening the lower section on the anchoring assembly and vertically suspending the anchoring line by means of a completely submerged float, then fastening the or each anchoring line on the supporting buoy.

17. The method according to claim 15, further comprising a step for placing the transport pipe, the placement step comprising placing a lower section of the transport pipe between the bed assembly and the support assembly, and placing an upper section of the transport pipe between the support assembly and the surface assembly, and connecting the lower section to the upper section.

18. The method according to claim 17, wherein the placement of the lower section of the transport pipe comprises fastening a flexible link near an upper end of the lower section of the transport type, the flexible link comprising an attachment stop on the supporting buoy;
   temporarily fastening the attachment stop on the supporting buoy;
   then pulling the flexible link to raise the upper end of the lower section of the transport pipe on the supporting buoy.

19. The support assembly according to claim 3, wherein the cable is a braided rope.

* * * * *